United States Patent

Dow et al.

[15] 3,656,784
[45] Apr. 18, 1972

[54] SLIP JOINT

[72] Inventors: Robert W. Dow, Tujunga; Arthur L. Moore, Mission Hills, both of Calif.

[73] Assignee: SSP Industries, Burbank, Calif.

[22] Filed: Apr. 1, 1970

[21] Appl. No.: 24,560

[52] U.S. Cl. ................................................. 285/187, 285/302
[51] Int. Cl. .................................................................. F16l 55/00
[58] Field of Search ................. 285/187, 302, 347; 277/152, 277/162

[56] References Cited

UNITED STATES PATENTS

| | | | |
|---|---|---|---|
| 1,707,312 | 4/1929 | McDaniel | 285/302 X |
| 3,507,522 | 4/1970 | Froman et al | 285/187 |
| 3,408,095 | 10/1968 | Moore | 277/152 X |

FOREIGN PATENTS OR APPLICATIONS 724,341  7/1952  Great Britain .......................... 277/152

Primary Examiner—Dave W. Arola
Attorney—Huebner & Worrel

[57] ABSTRACT

An adjustable slip joint adapted to be interposed in a tubular structure which may be varied in length due to exposure to very high temperatures and is normally under pressure. The joint includes telescoping first and second tubular members forming the tubular structure wherein a sealing means is interposed between the respective members. The sealing means is to prevent excessive pressure leakage from said tubular structure through said joint.

5 Claims, 5 Drawing Figures

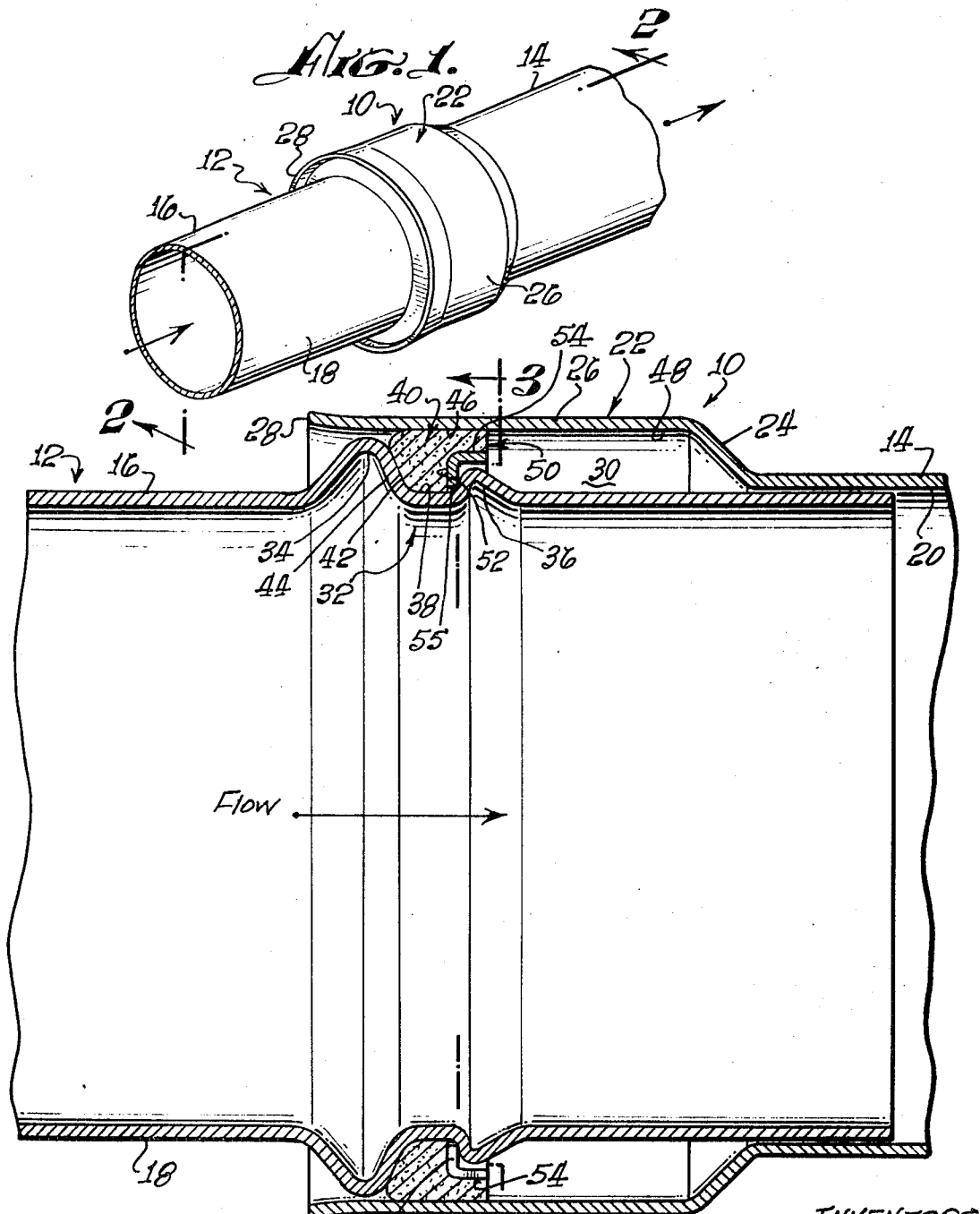

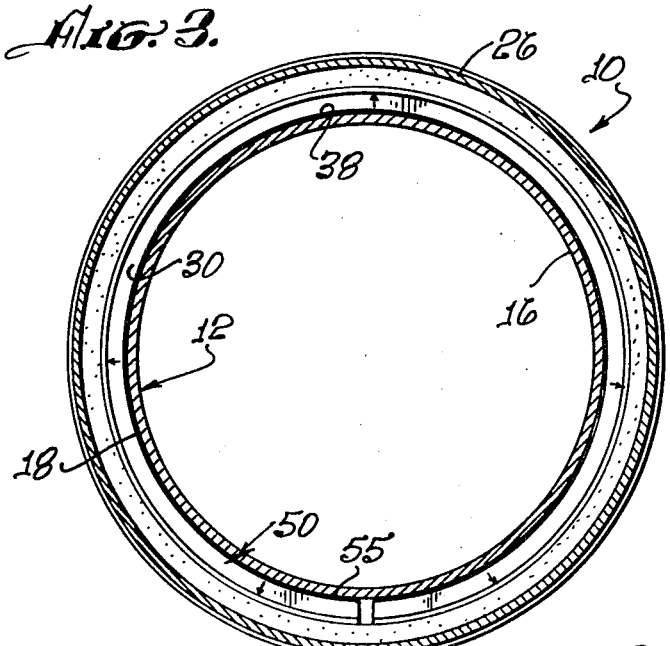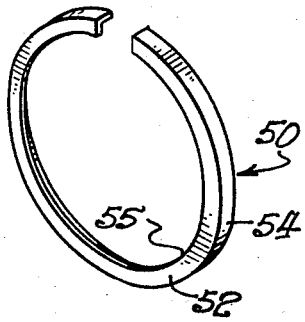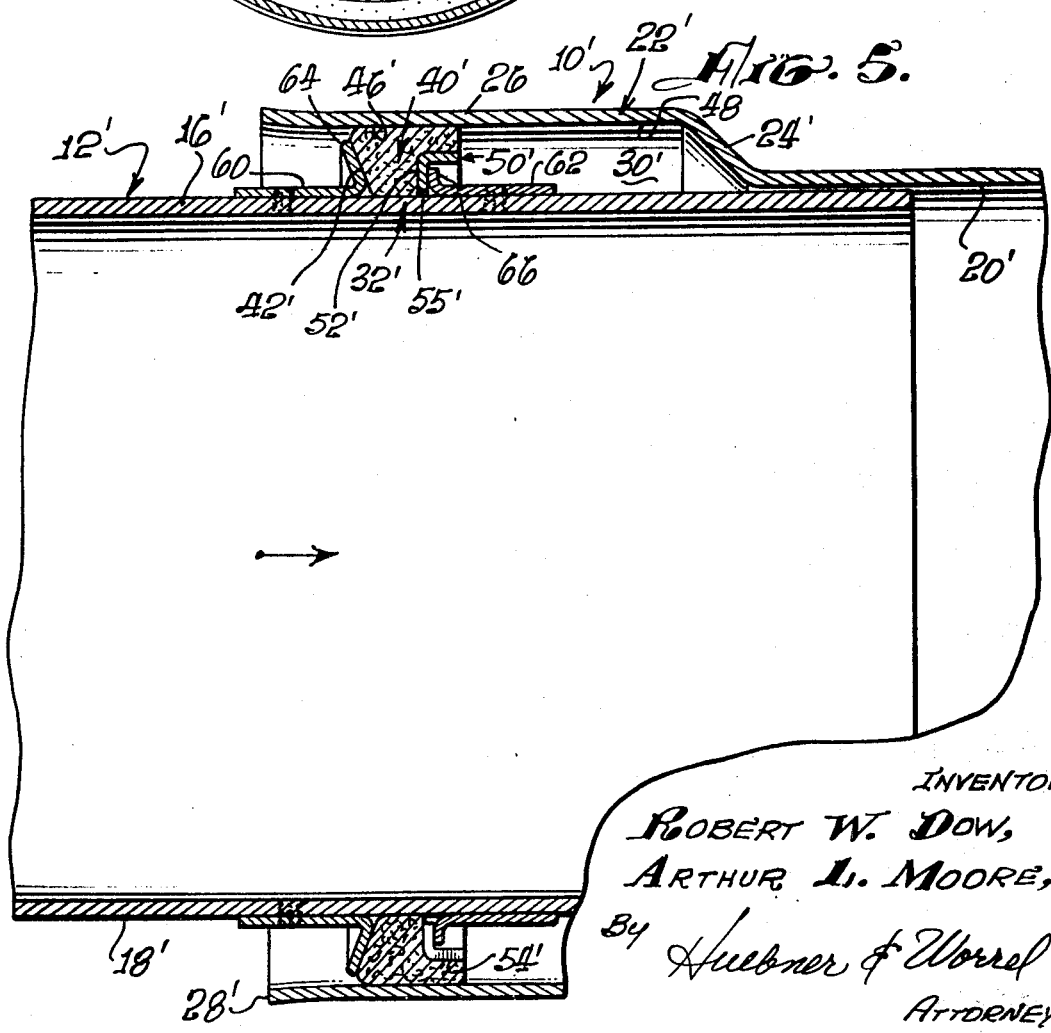

SLIP JOINT

BACKGROUND OF THE INVENTION

Heretofore, any type of an expandable joint, particularly utilized in exhaust systems, while including telescoping parts, have required an external annular clamp to be fitted around said joint and radially tightened to prevent leakage of pressure within the exhaust system through the joint.

Such a prior art joint has the disadvantage of requiring continual tightening of the clamp as the metal therein is expanded and contracted due to the excessive heat to which the joint is exposed. Additionally, such a clamp has the disadvantage of additional weight which is undesirable in aircraft where weight plays an important factor.

SUMMARY OF THE INVENTION

This invention is an adjustable slip joint particularly suited for use in aircraft exhaust systems wherein there is pressure exerted in the exhaust system and the joint is exposed to very high temperatures from the exhaust gases.

The joint is preferably formed wherein there is an outer or first tubular section and an inner or second tubular section which telescopes into the first section forming a complete tubular structure. The second tubular member includes spaced apart stop means to receive an annular seal means which is adapted to bear against the first tubular member to prevent leakage from said tubular structure through said joint. There is also included a pressure means in the form of an annular spring, interposed between the stop means and the seal means to continually urge and bias the seal means against the first tubular member. Also as a single seal means the joint is still capable of angulation or distortion during expansion without breaking the seal.

Thus, as the joint experiences temperature changes, there will be a constant engagement or dynamic seal against the moving area of the first tubular member as the second tubular member telescopes back and forth within the first tubular member due to thermal expansion.

In some cases, it is preferable that the outer or first tubular member be of an alloy different than the inner or second tubular member so that the outer member will expand less than the inner member. In other words, the first tubular member and second tubular member will have a different thermal coefficient of expansion, which would provide a tighter seal with increasing temperature.

It can been seen that other advantages of such a slip joint are that it is relatively easy to assemble, and disassemble for repair or replacement, inexpensive to manufacture and light in weight.

These and other advantages will become apparent from the following detailed description of the drawings.

BRIEF DESCRIPTION OF THE DRAWINGS

FIG. 1 is a perspective view of the slip joint of this invention;

FIG. 2 is a cross sectional view of the slip joint taken on line 2—2 of FIG. 1;

FIG. 3 is a cross sectional view of the slip joint taken on line 3—3 of FIG. 2;

FIG. 4 is a perspective view of the pressure means or spring utilized to maintain the constant seal in the joint; and FIG. 5 is a view similar to FIG. 2 illustrating a modified form of stop means to maintain the sealing means in position within the joint.

BRIEF DESCRIPTION OF THE PREFERRED EMBODIMENTS

FIG. 1 illustrates an adjustable slip joint generally designated 10 interposed in a tubular structure generally designated 12 wherein the tubular structure is formed of a first or outer tubular or tube member 14 and a second or inner tubular or tube member 16 telescopically received within the outer member 14. Preferably, the members 14 and 16 are fabricated from stainless steel, however any other appropriate metal may be used without departing from the spirit of the invention.

The slip joint 10 is particularly suited for use in aircraft exhaust systems where there is internal pressure as well as expansion of the tubular structure due to changes in temperature. It is well known that when there are changes in temperature, metal will normally expand and in certain exhaust systems it is desirable and necessary that there be some relief in the tubular structure to allow for the members to expand axially, radially or angularly so that any fittings that may be secured to the tubular structure will not become cracked due to repeated thermal cycling during the time that the exhaust system is being utilized.

It should be noted that the use of the slip joint 10 is not limited to aircraft exhaust systems, but may be utilized in any system under pressure where a movement of the ducting by exposure to heat or other structural motion may be involved.

It is preferable that the exterior diameter 18 of the second or inner tubular member 16 be slightly less than the interior diameter 20 of the first or outer tubular member 14 so that there will be a telescoping fit. However, with the joint to be described, it is not necessary that there be a tight fit between the respective members 14 and 16.

The first or outer tubular member 14 includes an end portion 22 which is of a larger internal diameter than the internal diameter 20 of the first member 14. This is preferably provided by an annular offset 24 bent outwardly from the plane of the first tubular member 14 and includes an elongated extension 26 which projects on a plane parallel with the plane of the first tubular member 14. Preferably, the end 28 of the elongated extension 26 is flared outwardly as seen in FIG. 2 so as to provide easy access for the second tubular member 16 into the first tubular member 14.

Thus, as can be seen from FIG. 2, with the end portion 22 of larger diameter than the first tubular member 14, there is an annular space 30 created between the end portion 22 and the exterior diameter 18 of the second inner tubular member 16.

In the preferred embodiment illustrated in FIG. 2, stop means 32 are formed on the second or inner tubular member 16 and include an annular rib 34 which projects upwardly from the plane of the first tubular member 16. Spaced forwardly of the annular rib 34 is a second annular rib 36 of the stop means 32 of lesser exterior diameter than the annular rib 34. Between the respective annular ribs 34 and 36 there is created a seat or saddle 38 adapted to receive a sealing means 40 and maintain it against lateral movement. The sealing means 40 preferably is an annular deformable gland type of packing seal. It has been found that a preformed graphite asbestos material with a high temperature lubricant is satisfactory for the desired seal against pressure leakage.

The sealing means 40 includes a slightly tapered face 42 of an angle corresponding to the forward wall 44 of the rib 34 which forms a secondary seal within the slip joint 10. The primary seal is accomplished where the upper surface 46 of the sealing means 40 engages the inner surface 48 of the end portion 22. As can be seen from FIG. 2, it is preferred that the upper surface 46 be of a length sufficient to assure adequate lateral contact with the inner surface 48.

The sealing means 40 opposite the tapered face 42 is recessed to accommodate a resilient pressure means or spring 50.

FIG. 4 illustrates the resilient pressure means or spring 50 wherein it is split and in cross section resembles an inverted "L" having a generally vertical bearing surface or leg 52 and a generally horizontal bearing surface or leg 54.

The inner diameter 55 of the spring 50 is slightly larger than the diameter of the annular seat 38 and because of its resilience, when it is radially compressed for insertion, it will constantly exert an outwardly radial pressure when so positioned.

When the slip joint is assembled, the spring 50 is inserted between the sealing means 40 and the annular rib 36. Because of the oversized and split nature of the annular spring 50, the leg 54 will continually exert outward annular pressure on the packing seal 40 forcing the seal 40 both against the surface 48 of the end portion 22 for the primary seal. Correspondingly the tapered face 42 against the forward wall 44 of the annular rib 34 constitutes the secondary seal.

As the annular tubular structure 12 is heated by the exhaust gases, the second inner tubular member 16 will be exposed to the flow shown by the arrow in FIG. 2 and thus, will expand more quickly than the member 14. It should also be noted that with the enlarged end portion 26, the metal surface 48 will be cooler than the seat 32 in the second inner tubular member 16 so that a dynamic seal is assured between the surface 46 and the moving seal 40, that is, a seal which is accomplished even though the respective surfaces 46 and 48 are in sliding contact caused by the thermal expansion of the second or inner tubular member 16 as it laterally expands or contracts due to thermal expansion.

It should be noted that with the dynamic seal being located at the coolest section of end portion 26 there is a more efficient seal with a greater cycle life.

In some instances to assure the maintenance of proper sealing pressure of seal 40, different alloys of stainless steel or other metal forming the first and second tubular members 14 and 16 are used. Such different alloys produce members 14 and 16 with lesser or higher coefficient of expansion.

Therefore, when the second or inner member 16 is of a higher coefficient of expansion than the first or outer member 14, there is a faster expansion of member 16 which will maintain greater pressure on the seal 40 against the surface 48.

In the modified form of the adjustable slip joint 10', illustrated in FIG. 5, the stop means 32' are formed by separate annular support collars 60 and 62 which are welded to the exterior diameter of the second inner tubular member 16'.

As can be seen, the configuration of the sealing means 40' is identical with the sealing means of the preferred embodiment and the support collar 60 includes a tapered forward wall 64 corresponding to the tapered face 42' of the seal 40'. In addition, the support collar 62 includes an upturned flange 66 which is spaced from the packing seal 40' and the resilient pressure means or spring 50' may be inserted therebetween.

When the adjustable slip joint 10 is installed within the tubular structure 12 of a pressure system wherein there is a rise in temperature, the longitudinal expansion of the second or inner tubular member 16 telescoped within the first or outer tubular member 14 will move axially within the first or outer tubular member 14 depending upon the resulting temperature rise therein. Even with the telescoping movement of the member 16, the continual outward annular pressure of the spring 50 against the gland type packing seal 40 will assure an adequate seal against the end portion 22 of the first tubular member 14 so that pressure leakage from the interior of the tubular structure 12 will be prevented.

Although we have herein shown and described our invention in what we have conceived to be the most practical and preferred embodiments, it is recognized that departures may be made therefrom within the scope of our invention.

We claim:

1. An adjustable slip joint adapted to be interposed in a pressurized tubular structure to vary the overall length of said tubular structure depending upon lateral or axial expansion due to internal heat and to prevent pressure leakage from within said structure, comprising: a first annular tube member, a second annular tube member telescopingly interfitted within said first annular tube member, said tubes forming said tubular structure and having a longitudinal axis, said first annular tube member including an enlarged diameter end portion thereby creating an annular space between said end portion and said second annular tube member when said tubes are in telescoping relationship, a pair of spaced apart annular projections extending radially outwardly from said second annular tube member into said annular space, and defining a seat therebetween, an annular gland type packing seal mounted in and at least a portion thereof bearing against said seat and said real bearing against said end portion of said first tube member, and a resilient split ring spring embodying a portion positioned within said seat and another portion overlying one of the annular projections and the portion within said seat bearable against said second annular tube member and exerting continuous radial outward pressure normal to said longitudinal axis against said seal biasing said seal against said end portion to prevent internal leakage from said tubular structure whether said structure is in a static condition or expanding.

2. An adjustable slip joint as defined in claim 1 wherein said spring portion includes a vertical leg positioned within said seat and said another portion includes a horizontal leg bent at a right angle thereto and overlying one of the annular projections.

3. An adjustable slip joint as defined in claim 2 wherein said horizontal leg exerts outward radial pressure against said sealing means.

4. An adjustable slip joint as defined in claim 1 wherein the thermal coefficient of expansion of said first annular tube member is less than the thermal coefficient of expansion of said second annular tube member thereby creating a more effective seal surface on said end portion for engagement by said annular sealing means.

5. An adjustable slip joint as defined in claim 1 wherein the annular gland type packing seal includes a larger surface area of contact against said end portion than an opposed surface area within said seat.

* * * * *